United States Patent [19]

Artigue

[11] Patent Number: 5,371,813
[45] Date of Patent: Dec. 6, 1994

[54] WAVELENGTH DIVISION MULTIPLEXER SUITABLE FOR INTEGRATED OPTICAL SYSTEMS

[75] Inventor: Claude Artigue, Bourg La Reine, France

[73] Assignee: Alcatel N.V., Amsterdam, Netherlands

[21] Appl. No.: 36,721

[22] Filed: Mar. 25, 1993

[30] Foreign Application Priority Data

Mar. 31, 1992 [FR] France .................. 92 03910

[51] Int. Cl.⁵ ............................... G02B 6/28
[52] U.S. Cl. ........................ 385/24; 385/45; 359/570; 359/572
[58] Field of Search ............... 385/14, 24, 45; 359/566, 569, 570, 571, 572, 573, 574, 575, 576

[56] References Cited

U.S. PATENT DOCUMENTS

| | | | |
|---|---|---|---|
| 4,736,360 | 5/1988 | McMahon | 385/33 |
| 4,776,661 | 10/1988 | Handa | 385/24 X |
| 4,923,271 | 5/1990 | Henry et al. | 359/130 |
| 5,002,350 | 3/1991 | Dragone | 385/24 X |
| 5,016,960 | 5/1991 | Eichen et al. | 385/45 |
| 5,048,909 | 9/1991 | Henry et al. | 385/27 |
| 5,093,876 | 3/1992 | Henry et al. | 385/28 |
| 5,165,104 | 11/1992 | Weverka | 385/7 |
| 5,226,100 | 7/1993 | Maerz | 385/45 |
| 5,228,103 | 7/1993 | Chen et al. | 385/14 |

FOREIGN PATENT DOCUMENTS 0196948 10/1986 European Pat. Off. ....... G02B 6/34

OTHER PUBLICATIONS

Patent Abstracts of Japan, vol. 9, No. 20 (P-330)(1743) Jan. 26, 1985 & JP-A-59 165 016 (Hitachi).

Primary Examiner—Frank Gonzalez
Attorney, Agent, or Firm—Sughrue, Mion, Zinn, Macpeak & Seas

[57] ABSTRACT

In a wavelength division multiplexer suitable for integrated optical systems, to multiplex a succession of waves ranked according to their wavelength two diffraction gratings are formed at the edges of a common guide area. One focuses odd ranked waves onto a first entry of an output guide. The other focuses even ranked waves onto a second entry of the same output guide.

3 Claims, 1 Drawing Sheet

WAVELENGTH DIVISION MULTIPLEXER SUITABLE FOR INTEGRATED OPTICAL SYSTEMS

BACKGROUND OF THE INVENTION

1. Field of the Invention

The optical data transmission capacity of systems using wavelength multiplexing can be increased by the use of integrated optoelectronic circuits. The range of usable wavelengths is usually limited, however, for at least two reasons: the need to distribute the wavelengths between the various types of system application (direct or coherent detection, local area networks or long-haul transmission, etc) and the possible benefits of working within the bandwidth of available optical amplifiers (rare earth doped optical fiber amplifiers, semiconductor amplifiers, etc).

2. Description of the Prior Art

The usual problem with increasing the capacity of transmission systems using wavelength multiplexing is to insert a maximal number of channels within a given bandwidth. This involves reducing the spacing between channels at the sending (multiplexing) end and at the receiving (demultiplexing) end.

One prior art multiplexer comprises a dispersive group constituting a diffraction grating and is in the form of a wafer comprising a guide layer disposed between two confinement layers, said guide layer comprising guide parts having a refractive index higher than that of said confinement layers whereby it is adapted to guide in its own plane optical waves constituting waves internal to said multiplexer, which comprises a multiplexing channel having:

- a guide part constituting a two-dimensional guide area delimited by an edge to enable said internal waves to propagate in various directions in said plane away from and towards said edge;
- a linear output guide having an entry at a point on said edge to receive internal waves from said guide area and to guide them in the direction of said output guide, said output guide connecting said entry to an output of the multiplexer to convey thereto a composite wave produced by superposing the internal waves that it receives;
- a limited section of said edge having a dispersive group formed by a periodic succession of points diffracting light to constitute, for internal waves propagating towards said section, a diffraction grating adapted to divert said waves into said guide area in directions dependent on their wavelength, said grating being concave to focus said waves; and
- a plurality of light injectors carried by said wafer for injecting respective internal waves into said guide area towards said diffraction grating from an injection point on said edge so that said grating focuses said wave towards said entry of said output guide and injects said wave into said output guide, said wavelengths of said internal waves being staggered in corresponding relationship to said plurality of injectors, and said injection points being staggered in corresponding relationship to said wavelengths to achieve said focusing of each internal wave at said output guide entry.

These diffraction gratings are called Fresnel mirrors. In the prior art the injection points, the diffraction grating and the output guide entry are preferably on a common "Rowland" circle.

To increase the number of channels grouped together by a multiplexer of this kind without increasing the overall bandwidth entails reducing the spacing between adjacent channels without causing crosstalk between the channels, and to achieve this it would seem necessary to increase the resolution of the diffraction grating employed.

Various solutions to this problem have been proposed. One is to increase the focal length of the diffraction grating. It requires the size of the wafer constituting the multiplexer to be increased in the same proportions, which is a major drawback in the field of telecommunications.

Another is to reduce the pitch of the grating. This runs up against a technological limit set by the methods available for etching the grating. This limit depends on the material of the wafer. It is higher for systems using GaInAsP materials than for the $Si_2/Si$ system. The latter has advantages in terms of cost and ease of integration, however. Whatever material is used it is necessary to increase the resolution of the multiplexer, i.e. to reduce the gap that has to be maintained between adjacent channels to prevent crosstalk.

One object of the present invention is to increase the number of channels in a given bandwidth which can be grouped by a multiplexer of limited size without causing crosstalk.

SUMMARY OF THE INVENTION

The present invention consists in a wavelength division multiplexer suitable for integrated optical systems and comprising a plurality of dispersive groups respectively diffracting and focusing a plurality of different wavelengths to inject them into a common output guide, in which multiplexer a plurality of said dispersive groups focus a plurality of groups of interleaving wavelengths onto a plurality of entries of said output guide.

There may be two, three or more dispersive groups. With three groups, for example, a first grating focuses the waves of rank $3k+1$, a second those of $3k+2$ and a third those of rank $3k+3$, where $k$ is an integer increasing from zero. More generally, when the waves to be multiplexed are ranked in the order of their wavelengths and if there are H respectively numbered dispersive groups, each dispersive group focuses the wave whose rank is equal to its number modulo H.

How the present invention may be put into effect will now be described by way of non-limiting example only with reference to the appended diagrammatic drawings. If the same dispersive group is shown in more than one figure it is always denoted by the same reference symbol.

DETAILED DESCRIPTION OF THE INVENTION

Figure 1:
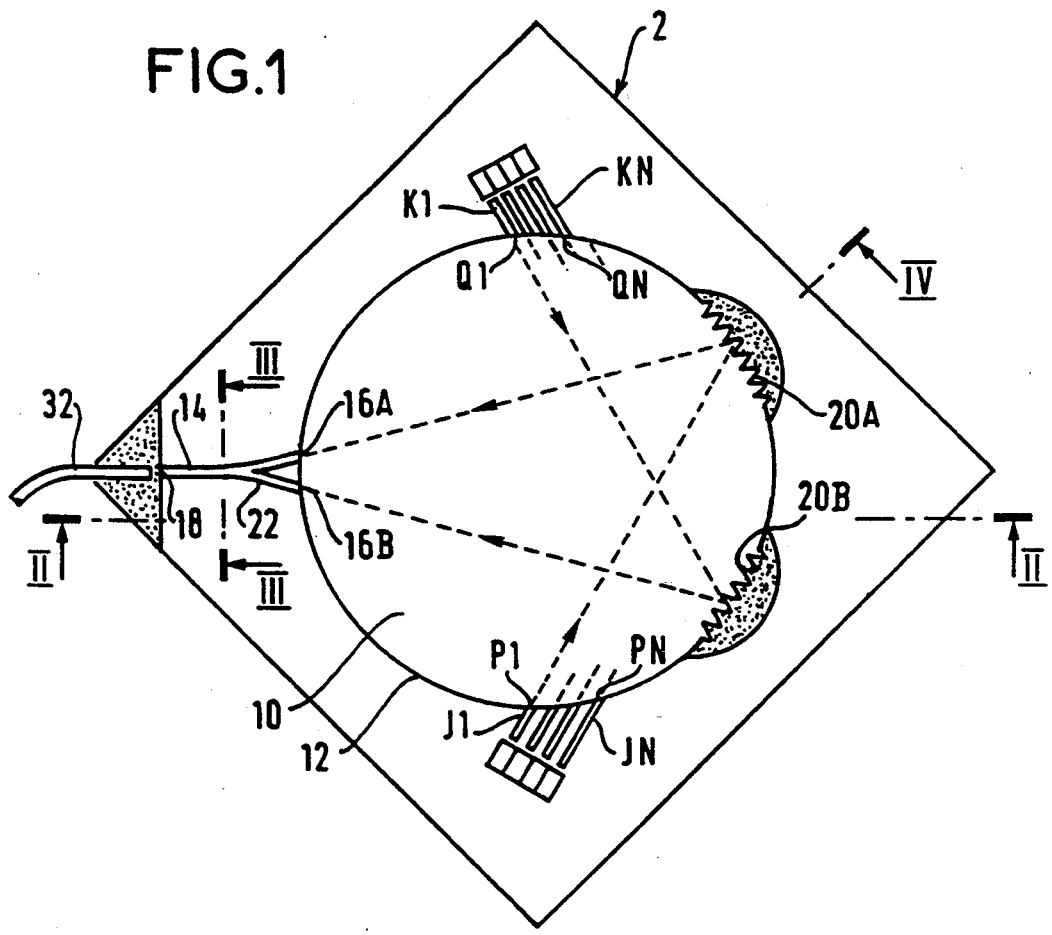
FIG. 1 is a plan view of a multiplexer in accordance with this invention comprising two Fresnel mirrors of two respective multiplexing channels.
Figure 2:
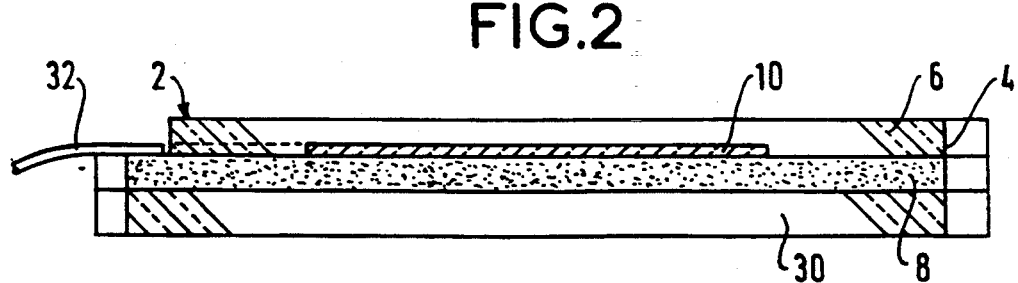
FIG. 2 shows this multiplexer in cross-section on the line II—II in FIG. 1.
Figure 3:
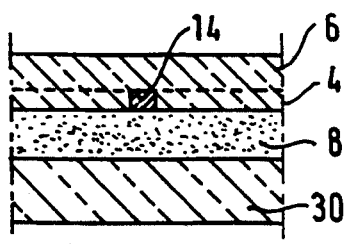
FIG. 3 shows this multiplexer in cross-section on the line III—III in FIG. 1.
Figure 4:
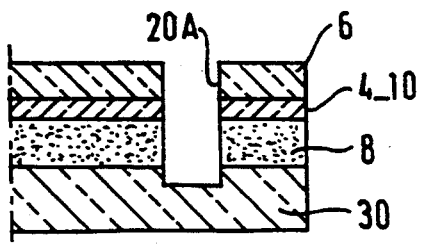
FIG. 4 shows this multiplexer in cross-section on the line IV—IV in FIG. 1.

The multiplexer is in the form of a wafer 2 comprising a guide layer 4 disposed between two confinement layers 6, 8 and comprising guide parts in which it has a refractive index greater than that of the confinement layers. It is therefore adapted to guide in its own plane optical waves constituting waves internal to the multiplexer.

The multiplexer comprises the following dispersive groups:

- A guide part constituting a two-dimensional guide area 10 delimited by an edge 12 to enable the internal waves to propagate in various directions in this plane away from and towards this edge.
- A linear output guide 14 having a combiner 22 and entries 16A and 16B each at a point on the edge 12 to receive internal waves from this guide area 10 and to guide them in the direction of the output guide 14 which connects the entries 16A and 16B to an output 18 of the multiplexer to convey to the latter a composite wave obtained by superposing the internal waves that it receives.
- Two limited sections of the edge 12 each comprising a periodic succession of points diffracting light to constitute for internal waves propagating towards this section a respective diffraction grating 20A, 20B adapted to divert these waves into the guide area 10 in directions dependent on their wavelength. These gratings are concave to focus these waves.
- A plurality of light injectors J1 through JN for the first multiplexing channel and a plurality of light injectors K1 to KN for the second channel. These injectors are carried by the wafer 2 and each injects an internal wave into the guide area 10 towards the respective diffraction grating 20A or 20B from an injection point P1 through PN or Q1 through QN on the edge 12.

The gratings focus these waves towards the respective entries 16A and 16B of the output guide and inject these waves into this guide. The wavelengths of the internal waves for each channel are staggered in corresponding relationship to the respective injectors. The injection points of each channel are staggered in corresponding relationship to the wavelengths to focus each internal wave at the output guide entry respective to the channel.

The two multiplexing channels share the guide area 10 and the multiplexer output 18. Each multiplexing channel has its own light injectors, its own diffraction grating and its own entry to the output guide 14. The injection points of the two multiplexing channels are chosen so that the wavelengths associated with the injection points of each channel are interleaved with the wavelengths associated with the injection points of the other channel.

The wavelengths of the waves to be multiplexed form a substantially regular succession in which each wavelength is separated from an adjacent wavelength by an interval dependent on the spectral density of a transmission network in which the multiplexer is used. This succession defines a rank 1 through 2N for each wavelength. Each wavelength and each injection point PX, QY has a rank $2X-1$, $2Y$ identical to the rank of the respective wavelength. The two multiplexing channels respectively constitute an odd channel J1 through JN, 20A, 16A with odd ranked injection points P1 through PN and an even channel K1 through KN, 20B, 16B with even ranked injection points Q1 through QN. The spacing between the wavelengths of two internal waves focused by the same diffraction grating is therefore always at least equal to substantially twice said fixed interval.

The guide layer, lower confinement layer 8 and upper confinement layer 6 are of silica doped with phosphorus to constitute the guide parts. They are deposited on a silicon substrate 30. The lower confinement layer 8 is shown shaded to differentiate it.

To make the invention easier to understand the edge 12 of the guide area is shown coincident with the Rowland circle. In practice, this edge may extend further, for example to the edge of the wafer 2, at a distance from the injection points, the diffraction gratings and the output guide entries.

The light injectors are linear guides formed in the guide layer. They are fed by GaInAsP/InP lasers welded into housings etched into the wafer.

The output guide 14 is also formed in the guide layer but it could instead comprise an optical fiber Y-junction. It is joined to a pigtail optical fiber 32 and glued to a flat 34 etched in the wafer 20.

Fresnel mirrors as described hereinabove could be replaced with other dispersive groups such as combinations of geodesic lenses and geodesic prisms.

As is well known, a multiplexer may be used to constitute a demultiplexer.

There is claimed:

1. Wavelength division multiplexer suitable for integrated optical systems and comprising H respectively numbered diffraction gratings, each of which diffracts and focuses a group of different wavelengths to inject them into a common output guide, wherein:

said H respectively numbered diffraction gratings focus respective groups of different wavelengths onto a corresponding plurality of waveguide leads which combine to form said output guide;

wavelengths to be multiplexed are ranked in wavelength order; and each of said diffraction gratings focuses the group of different wavelengths whose rank is equal to its number modulo H.

2. Wavelength division multiplexer for integrated optical systems in the form of a wafer comprising a guide layer disposed between two confinement layers, said guide layer comprising guide parts having a refractive index higher than that of said confinement layers whereby it is adapted to guide in its own plane optical waves constituting waves internal to said multiplexer, which comprises a multiplexing channel having:

a guide part constituting a two-dimensional guide area delimited by an edge to enable said internal waves to propagate in various directions in said plane away from and towards said edge;

a linear output guide having an entry at a point on said edge to receive internal waves from said guide area and to guide them in the direction of said output guide, said output guide connecting said entry to an output of the multiplexer to convey thereto a composite wave produced by superposing the internal waves that it receives;

a limited section of said edge having a dispersive group formed by a periodic succession of points diffracting light to constitute, for internal waves propagating towards said section, a diffraction grating adapted to divert said waves into said guide area in directions dependent on their wavelength, said grating being concave to focus said waves; and a plurality of light injectors carried by said wafer for injecting respective internal waves into said guide area towards said diffraction grating from an injection point on said edge so that said grating focuses said wave towards said entry of said output guide and injects said wave into said output guide, said wavelengths of said internal waves being staggered in corresponding relationship to said plurality of injectors, and said injection points being staggered in corresponding relationship to said wavelengths to achieve said focusing of each internal wave at said output guide entry;

in which multiplexer said output guide has two entries and an optical combiner for connecting said two entries to said output of the multiplexer which comprises first and second multiplexing channels sharing said guide area and said multiplexer output, each multiplexing channel having its own plurality of injectors, its own plurality of wavelengths, its own plurality of injection points, its own diffraction grating and its own output guide entry, said pluralities of injection points of said two multiplexing channels being chosen so that the wavelengths associated with the injection points of the first channel are interleaved with the wavelengths associated with the injection points of the second channel.

3. Multiplexer according to claim 2 wherein said wavelengths form a substantially regular succession in which each wavelength is separated from an adjacent wavelength by a fixed interval, said succession defines a respective rank for each wavelength, each injection point has a rank identical to the rank of the associated wavelength and said multiplexing channels respectively constitute an odd channel with odd ranked injection points and an even channel with even ranked injection points, whereby the interval between the wavelengths of two internal waves focused by the same diffraction grating is always at least equal to substantially twice said fixed interval.

* * * * *